United States Patent [19]

Roetling

[11] Patent Number: 4,633,327
[45] Date of Patent: Dec. 30, 1986

[54] ENHANCEMENT HALFTONING

[75] Inventor: Paul G. Roetling, Ontario, N.Y.

[73] Assignee: Xerox Corporation, Stamford, Conn.

[21] Appl. No.: 550,330

[22] Filed: Nov. 10, 1983

[51] Int. Cl.$^4$ .............................................. H04N 1/40
[52] U.S. Cl. ....................................... 358/283; 382/53
[58] Field of Search ................... 358/280, 283; 382/53, 382/51, 54

[56] References Cited

U.S. PATENT DOCUMENTS

| 4,030,125 | 6/1977 | Bedell et al. | 358/169 |
| 4,051,536 | 9/1977 | Roetling | 358/298 |
| 4,246,614 | 1/1981 | Knox | 358/283 |
| 4,297,676 | 10/1981 | Moriya et al. | 382/53 |
| 4,547,811 | 10/1985 | Ochi et al. | 358/280 |

OTHER PUBLICATIONS

Journal of the Optical Society, vol. 66, No. 10, Oct. 1966, "Halftone Method with Edge Enhancement and Moire Suppression," Roetling, P. G.

Primary Examiner—James J. Groody
Assistant Examiner—Edward L. Coles
Attorney, Agent, or Firm—R. F. Chapuran

[57] ABSTRACT

A method of determining image input contrast to dynamically adjust screen amplitude. The screen amplitude is controlled on a dot by dot basis to selectively enhance the original image. There is a higher amplitude when the input contrast is low and a lower amplitude when the input contrast is high. Thus, the partial dots more closely follow image detail at high contrast, while at low contrasts, noise is not enhanced. In a specific embodiment, depending upon the input contrast, a predetermined screen amplitude is used.

9 Claims, 5 Drawing Figures

ENHANCEMENT HALFTONING

This invention relates generally to an electronic halftoning system for reproducing images and more specifically to a system for the automatic enhancement of selected portions of a halftone image.

Halftone images are commonly used in printed material, and now additionally in computer displays, to represent continuous-tone images in systems where only two levels (usually black and white) can be represented at any point. The term halftone, or equivalently binary image, means an image formed by black dots of various sizes so as to give the effect of continuous tone when viewed at normal reading distance. This definition includes the digital case where each black or white spot is a fixed size in a fixed array, such that the variable size dots are generated by turning several adjacent spots black.

A common method of producing a halftone image is the use of a screen consisting of a pattern which has the same fundamental frequency in two orthogonal directions. The halftone screen is combined with the pictorial information. In a photographic method this involves imaging the picture through the screen, thus multiplying the transmittances. In most electronic systems, the screen and pictorial information are added. It should also be noted that in a digital system both the screen information and the pictorial information are sampled functions.

When the screen is periodic, the fundamental period of the screen is substantially larger than the sample interval, giving many samples per period. For both photographic and digital methods the combined pictorial and screen information is next subjected to a threshold. This is accomplished by recording on a high-contrast film for photographic halftoning or by a numerical comparison for digital halftoning. In either case, the result of the threshold operation is to produce a binary image.

In the usual method, the threshold is a fixed value and adjustment of the screen pattern (including so-called bump and flash exposures in the photographic case) is used to adjust the effective grey scale of the halftone as desired. This process results in dots of varying size, shape, and location within their repetitive pattern. In the digital case, each sample of the halftone screen and corresponding sample of the pictorial information are combined and result in one bit, which is then printed either black or white at a given location. Since there are a number of samples within each cycle of the halftone screen, several adjacent bits normally combine to give the effect of a single halftone dot with size, shape, and location depending on the pattern of bits.

Most halftone methods do a good job of giving the proper illusion of grey scale for low-spatial-frequency information on the continuous-tone image and partial dots in the halftone allow representation of higher frequency detail when detail contrast is sufficient. When the fine detail is periodic, however, spurious low-frequency patterns occur.

One prior art method for converting a continuous-tone image to a halftone incorporates the capability for both suppression of spurious (aliasing) signals and edge enhancement. The basis of the method for suppression of spurious signals and edge enhancement is to adjust the threshold for each halftone cycle in a manner which guarantees that the resultant halftone image matches the average reflectance of the original image. U.S. Pat. No. 4,051,536 is an example. This approach preserves the characteristics of the original halftone process such as partial dots. In areas of uniform grey in the original, the adjustable threshold will remain constant.

In general, the pictorial information over the area corresponding to one halftone cycle in two dimensions is averaged or else a low-pass filtered value is used, giving only low spatial frequency information in either case. If grey scale information is to be preserved, this average determines precisely what percentage of the area must be covered by the halftone dot. In a digital system, this is equivalent to the number of bits which must be black of the total number of bits. Starting with the complete area of the binary image over one halftone cycle either all black or all white, the threshold is set at the extreme value to generate this case. The threshold is next adjusted monotonically. Either the total number of bits or dot size is examined during the adjustment process. As soon as the correct dot size is reached, the threshold value is fixed and the binary image is generated for that cycle of the halftone.

Another prior art method is shown in U.S. Pat. No. 4,246,614. In particular, there is disclosed a method by which additional information of location and contrast of input picture detail is used to control phase of the halftone screen to achieve improved binary representation of the image, further reducing spurious patterns and possibly improving detail.

It also is known in the prior art to be able to control the degree of enhancement of an image by adjusting the amplitude of the screen. See Journal of the Optical Society of America, Volume 66, No. 10, October 1976. A relatively small amplitude screen will provide a sharper detailed image. On the other hand, this can also provide a noisy appearance. For some images it would be desirable to be able to selectively and automatically provide various screen amplitudes for various portions of the image. In particular, it is desirable to provide more enhancement in highly detailed portions of an image and to provide less enhancement in uniform portions of an image. This is not shown in the prior art.

It is, therefore, an object of the invention to provide a new and improved method of enhancing a digital halftone image. It is another object of the invention to provide for the automatic selective switching of screen amplitudes for various portions of the image.

Further advantages of the present invention will become apparent as the following description proceeds, and the features characterizing the invention will be pointed out with particularity in the claims annexed to and forming a part of this specification.

Briefly, the present invention is a method of determining image input contrast to dynamically adjust screen amplitude. The screen amplitude is controlled on a dot by dot basis to selectively enhance the original image. There is a higher amplitude when the input contrast is low and a lower amplitude when the input contrast is high. Thus, the partial dots more closely follow image detail at high contrast, but without enhancing noise in uniform areas. In a specific embodiment, depending upon the input contrast, a predetermined screen amplitude is used.

For a better understanding of the present invention, reference may be had to the accompanying drawings wherein the same reference numerals have been applied to like parts and wherein.

Figure 1:
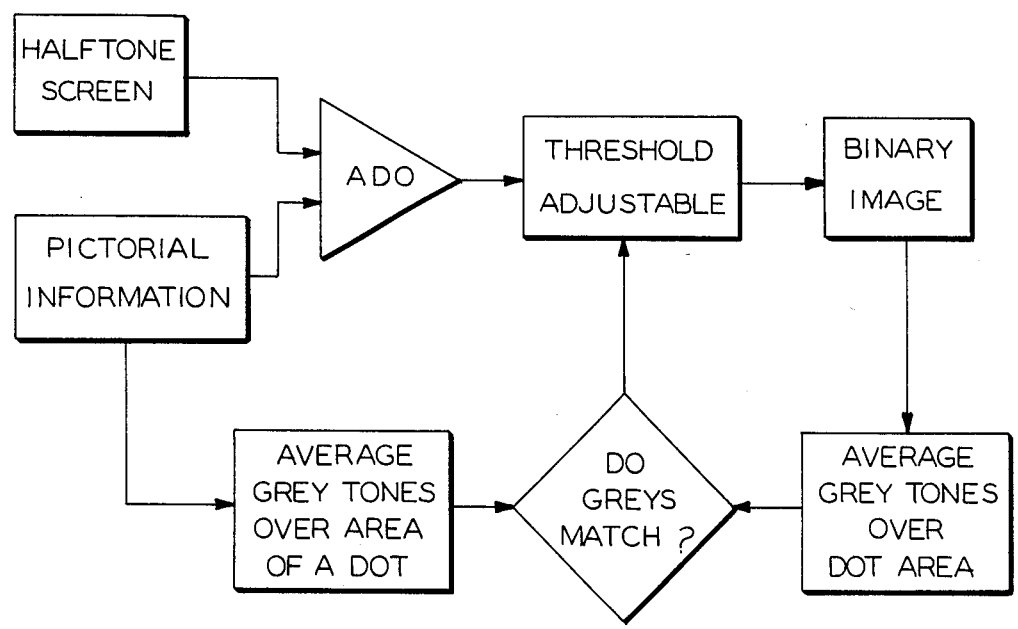
FIG. 1 is a prior art block diagram illustrating image enhancement.

With respect to FIG. 1, there is shown a generalized block diagram showing a prior art image enhancement. The halftone screen block is a non-image related pattern which could be random, but is usually a periodic pattern. Generally, the screen consists of a pattern which has the same fundamental frequency in two orthogonal directions. As shown in FIG. 1, the halftone screen is combined with the image or pictorial information. In most electronic systems, this is done by adding the signals together as illustrated in the add block.

The signal from the add block is then conveyed to an adjustable threshold circuit. Usually, the threshold is a fixed value and adjustment of the screen pattern is used to adjust the effective grey scale of the halftone as desired. In the digital case, each sample of the halftone screen and corresponding sample of the pictorial information are combined to provide one bit. This bit is printed either black or white at a given location. Since there are a number of samples within each cycle of the halftone screen, several adjacent bits normally combine to give the effect of a single halftone dot with size, shape and location depending on the pattern of bits.

The threshold for each halftone cycle is adjusted in a manner to guarantee that the resultant halftone image matches the average reflectance of the original signal. This approach preserves the characteristics of the original halftone process such as partial dots. In areas of uniform grey in the original, the adjustable threshold will remain constant.

To adjust the threshold, the pictorial information over the area corresponding to one halftone cycle in two dimensions is averaged or a low pass filtered value is used, giving only low spatial frequency information. This average determines what percentage of the area must be covered by the halftone dot. The threshold is set at the extreme value which would provide either all black or all white over one halftone cycle. The threshold is next adjusted monotonically. Either the total number of bits or dot size is examined during the adjustment process.

As soon as the correct dot size is reached, the threshold value is fixed and the binary image is generated for that cycle of the halftone. It should be pointed out that this is equivalent to a number of other computational procedures such as, for example, calculating the histogram of the combined pictorial and screen values and thereby finding the appropriate threshold for which the proper percentage of the values exceed threshold.

Once the threshold value is established for one cycle of the halftone, it will cause the appropriate number of bits to be turned white, and the rest remaining black. Which bits in the pattern are white is chosen by locating the N largest values of the sum of picture and screen. As in normal halftones, if a black/white edge passes through the area, the largest sum values will exactly match the white regions (screen plus black never exceeds white plus any value), thus correctly representing full contrast details. At lower edge contrast, the screen values added to the picture values create some asymetry such that more of the resulting white area is on the lighter side of the edge.

Figure 2:
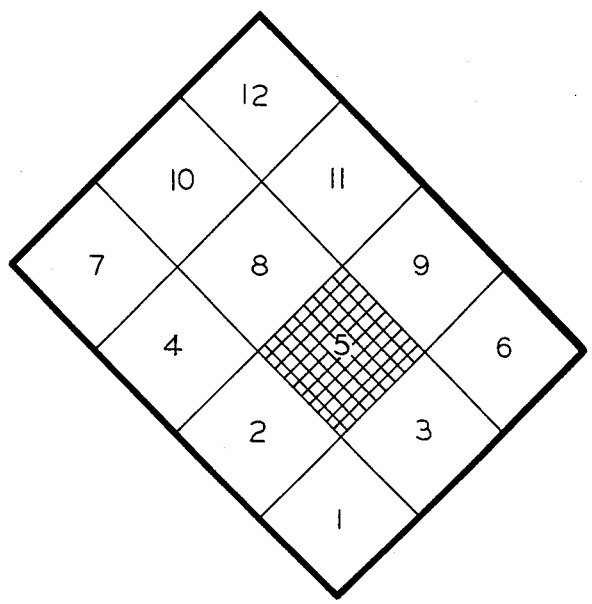
FIG. 2 is an enlarged view of a matrix of pixel dots.

With reference to FIG. 2, there is shown an enlarged view of a matrix of pixel or image dots. In accordance with the present invention, the local image contrast is computed by finding the maximum and minimum pixel grey values over the area of the halftone cell being worked on. In FIG. 2, the area being worked on is represented by the crosshatched block 5. The maximum grey value minus the minimum grey value is contrast.

$$\text{CONTRAST} = \text{MAX}_{G_1 V_1} - \text{MIN}_{G_1 V_1}$$

This difference within one cell or over one screen period of pixels, is used to select a particular screen value related to the difference.

Any arbitrary number of screen values can be used for a range of contrasts or maximum value minus minimum value ranges. Thus, by adjusting the amplitude of the screen (by selecting a particular screen pattern) the degree of enhancement of the picture can be controlled. The selective degree of enhancement of the image can be done automatically simply by determining the contrast and branching or switching to a particular screen pattern. Appendix A is a listing of a preferred embodiment of the present invention.

Figure 3:
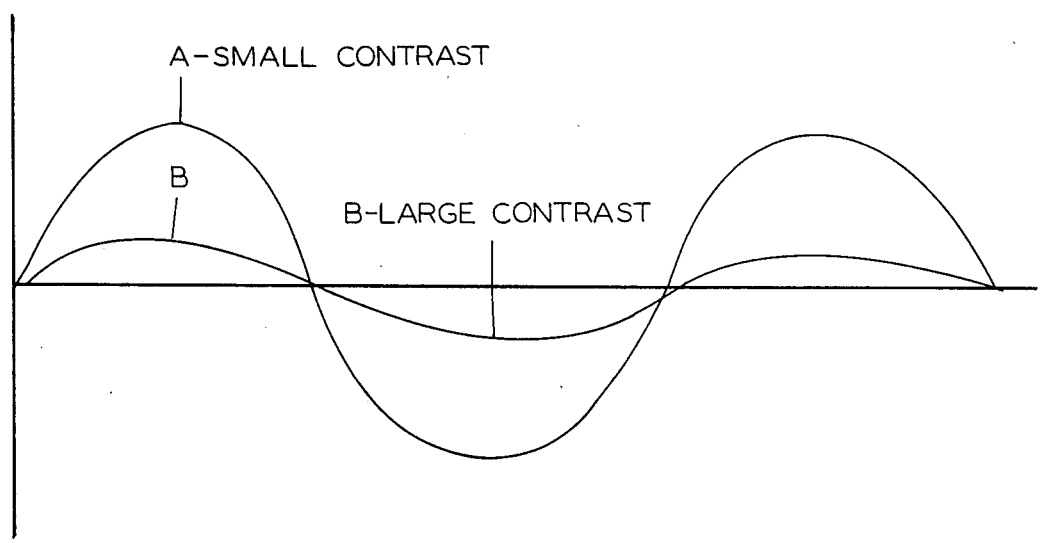
FIG. 3 is an illustration of varying screen amplitudes.

For low contrast, the screen is used at normal values. For medium contrast, in a preferred embodiment, the screen is divided by two, giving half the screen values. For the highest contrast, the screen is not used (i.e. zero screen values). FIG. 3 illustrates typical screens to be used for small or large contrasts. That is, curve A would be used if the difference between the maximum and minimum grey levels is small and curve B would be used if the difference is large.

Figure 4:
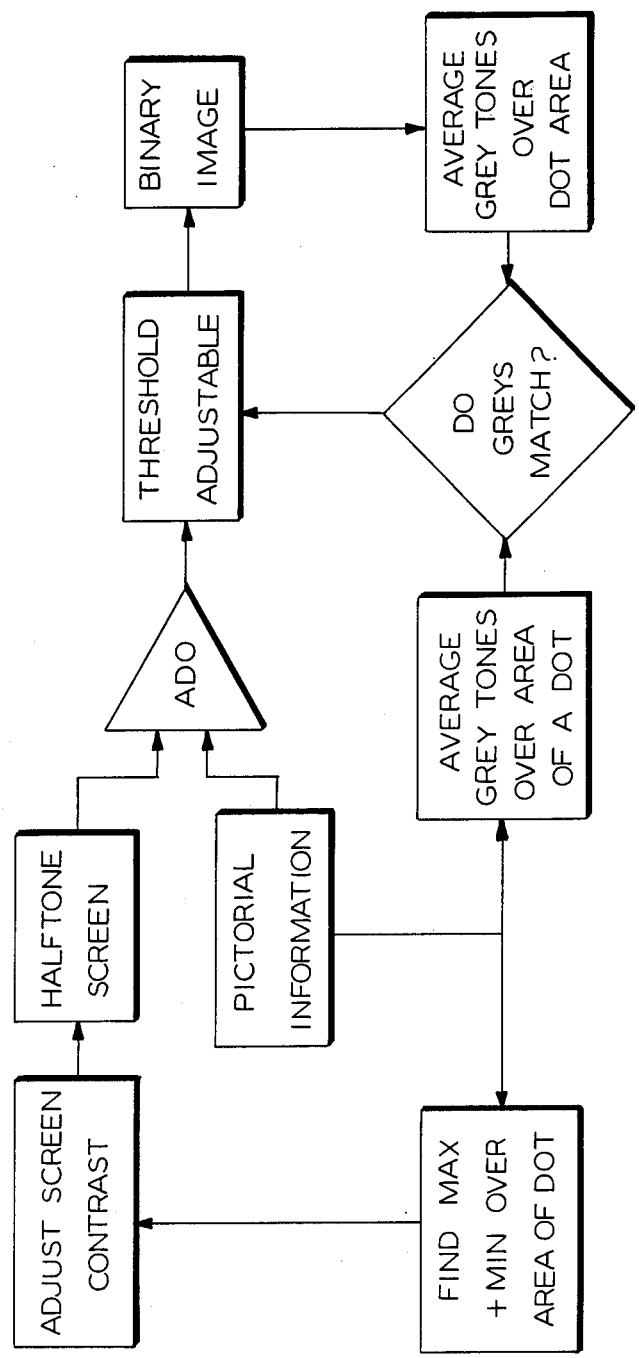
FIG. 4 is a general flow chart according to the present invention.
Figure 5:
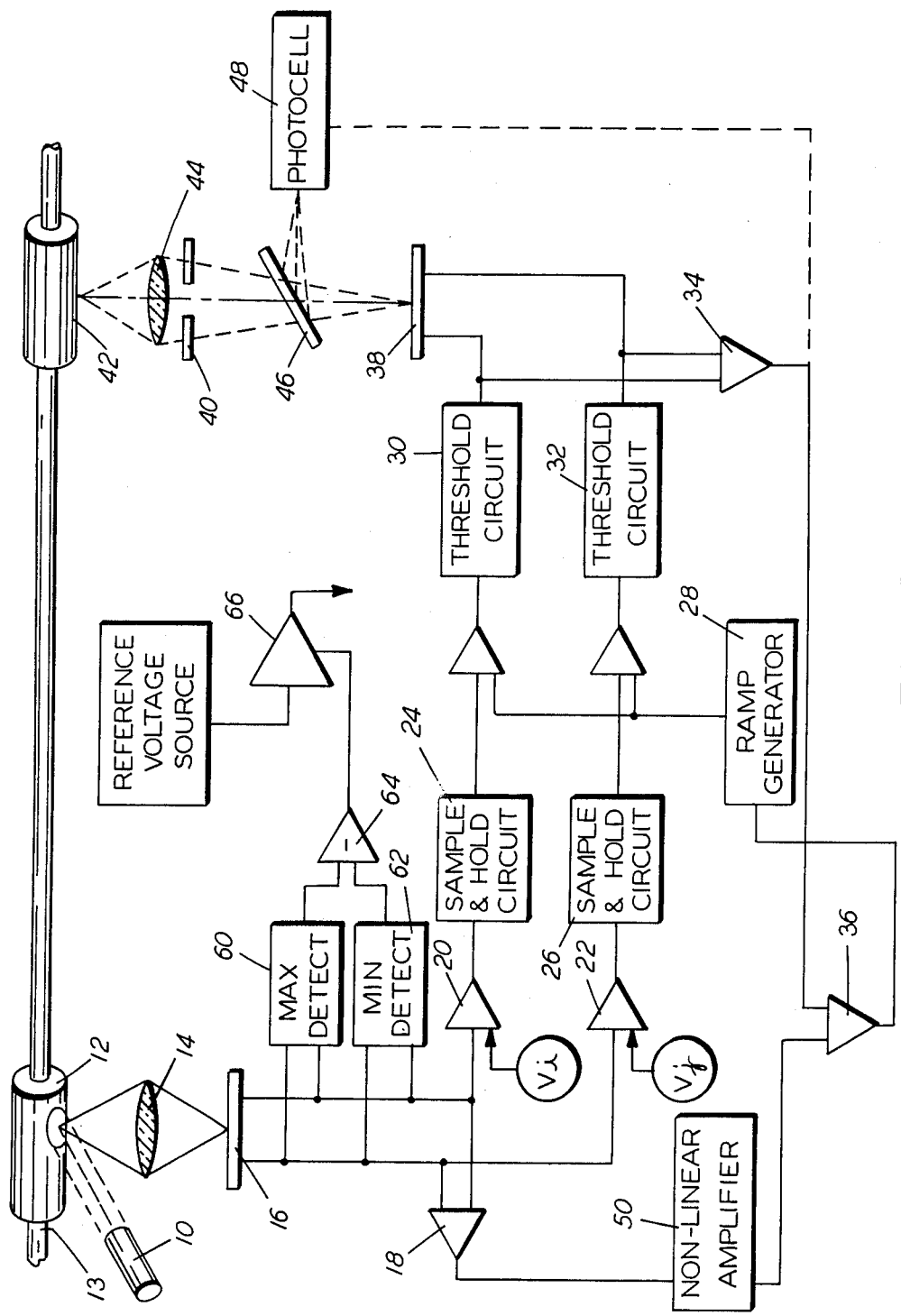
FIG. 5 is a schematic block diagram of an embodiment of an electronic halftone image reproduction system according to the invention.

FIG. 4 is a general flow chart and FIG. 5 is a schematic block diagram of an embodiment of the halftone image system according to the present invention. A scanner 10 sequentially illuminates an original image which is attached to the periphery of drum 12 which rotates about shaft 13. Of course, the original image may be a transparency as well as an opaque document. Scanner 10 operates at speeds of a millisecond or less per halftone period covered, though the actual speeds will depend upon the characteristics of the particular optical and electronic components used in any embodiment of the invention.

Each halftone dot period of the original image illuminated by scanner 10 is sequentialy imaged by imaging lens 14 onto a light sensitive element 16 such as, for example, a photodiode array. The light sensitive element includes a plurality of light sensitive detectors, one for each discrete element in the halftone period area. Typically, the halftone period area is broken down into at least 5×5 discrete elements. The various intensities of light striking the light sensitive element 16 are dependent upon the densities of the toner in the original image.

The light is transduced by photodiode array 16 into analog electronic signals. The analog electronic signal from each light sensitive detector in photodiode array 16 is fed into summing circuit 18, to be added to give a signal representative of the total amount of light reflected by the halftone dot period.

Alternatively, a beam splitter could be interposed between imaging lens 14 and photodiode array 16 and a portion of the light in the beam directed to a separate photodiode having only a single light sensitive detector.

In this case, the light would be transduced into a single electronic signal representative of the total amount of light reflected by the halftone dot period and the electronic signal would replace the output of circuit 18. Although the embodiment shown in FIG. 5 is illustrated with a moving scanner 10, rotating drum 12, lens 14 and photodiode array 16 moving with scanner 10, any suitable arrangement of these elements may be employed. For example, the scanner may be stationary and the shaft 13 on which the drum is mounted may be a lead screw so that the drum moves transversely as it is rotated.

The electronic signal from each light sensitive detector in photodiode array 16 is then fed into separate summing circuits 20, 22 to be combined with a reference voltage representative of the halftone screen function. For purposes of illustration, the signals from two of the light sensitive detectors in photodiode array 16 are shown; however, it is understood that the electronic signal from each detector is treated in a similar fashion. A different reference voltage, illustrated by $v_i$ and $v_j$ is added to the output signal from the respective detectors in photodiode array 16 by summing circuits 20 and 22, respectively. It is again noted that the values of the respective reference voltages can be varied to control detail contrast.

The signals from the summing circuits are then brought into sample and hold circuits 24 and 26, respectively. These sample and hold circuits are not required if the original image is scanned slowly enough; however, they are preferred since they allow the image to be scanned electronically, that is, at speeds of a millisecond or less per halftone period covered. Each electronic signal at this point represents the sum function of the subcell pictorial information and the halftone screen function. The sum function for each subcell is next added to a dynamically adjusted amplitude varying voltage signal common to all subcells supplied by a single ramp generator 28. Each electronic signal is then directed through fixed level threshold circuits 30 and 32, respectively, to a light emitting diode array 38 which includes as many light emitting diodes as the number of light sensitive detectors in photodiode 16. The light emitting diodes are arranged in a pattern similar to that of the light sensitive detectors in photodiode array 16 which control them.

In accordance with the present invention, a maximum detector 60 and a minimum detector 62 are electrically connected to the photodiode array 16 to detect the maximum and minimum pixel grey levels. A difference circuit 64 subtracts the minimum level from the maximum level to provide local image contrast. This image contrast or the signal from circuit 64 controls the gain of a set of amplifiers illustrated at 66. Alternatively, a set of values loaded into look-up tables could be controlled in a digital implementation.

The control of the amplifiers 66 yields a small amplifier gain for a large local image contrast and a large amplifier gain for a small local image contrast. Suitable reference voltages are sent through variable gain amplifier 66 to yield adjusted reference voltages. These adjusted reference voltages $v_i$ and $v_j$ are conveyed to summing circuits 20 and 22.

Not shown, but comprised of well known elements, is a timing mechanism which starts a sequence by triggering the sample and hold circuits 24, 26 to sample the signals from summing circuits 20 and 22, respectively. The timing mechanism starts the ramp generator 28 voltage increasing, thus effectively producing the dynamically varying threshold. The outputs of the threshold circuits 30 and 32 are fed into circuit 34 where they are summed. The signal representing the sum is directed into circuit 36 which compares the electronic signal from circuit 34 with the electronic signal from circuit 18. When the two voltage signals match, circuit 36 emits a pulse which stops any further increase of the voltage signal from ramp generator 28.

In operation, the electronic signals representing the sum functions having the largest values will cause the appropriate light emitting diodes in array 38 to become operative until the total light output matches the total amount of light reflected by the original image in the area of the halftone period being examined. The remaining light emitting diodes will not be energized. A short time after these actions the timing mechanism opens shutter 40 momentarily allowing the energized light emitting diodes to expose a photoreceptor 42 through lens 44. The photoreceptor 42 may be any suitable light sensitive recording medium such as a photographic film or a charged xerographic member. In one embodiment, as illustrated, the photoreceptor comprises a charged xerographic drum which rotates about shaft 13 and is matched to the movement of drum 12 which carries the original image. Alternatively, photoreceptor 42 could be moved by another scanner, similar to 10 and matched to it. After the photoreceptor is exposed the timer resets the circuits in the system and starts the next cycle. This sequence is repeated for each halftone period of the original image.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

I claim:

1. A method for selectively enhancing a portion of a digital halftone image in a system having a screen function with a variable parameter, the parameter capable of being changed to continuously or discretely vary the contrast of the screen for image enhancement, said image including a plurality of pixel elements, comprising the steps of:

(a) scanning a portion of the image to determine the maximum and minimum grey scale levels within said portion, (b) determining the difference between the maximum and minimum grey scale levels within said portion, and (c) changing the parameter to selectively vary the contrast of the screen in response to the difference between the maximum and minimum grey scale levels for enhancement of said portion of the digital halftone image.

2. The method of claim 1 including the step of repeating the steps a, b, and c for the entire digital halftone image.

3. The method of claim 1 wherein said screen function is a periodic wave form and wherein said portion is a predetermined number of pixel elements related to one period of the screen function.

4. The method of claim 1 including the step of automatically varying the parameter in response to the difference between the maximum grey scale levels.

5. A method for creating an enhanced halftone reproduction of an original image comprising the steps of:
   (a) providing electronic signals representing the grey scale values of said original image over a halftone dot period;
   (b) finding the maximum and minimum grey scale values over said halftone dot period;
   (c) determining the difference between the maximum and minimum grey scale levels;
   (d) providing a screen function with a variable parameter in electronic form, said variable parameter being changed to continuously or discretely vary the contrast of the screen; and
   (e) changing said parameter to selectively vary the contrast of the screen in response to said difference.

6. The method as defined in claim 5 wherein one picture element of said original image is used to control one subcell of the halftone dot period.

7. Apparatus for providing an enhanced halftone reproduction of an original image on an image member including in combination:
   means for providing electronic signals representing the grey scale of an original image over a halftone dot period;
   means for determining the difference between the maximum and minimum grey scale values over said halftone dot period;
   means for providing a screen function with a variable parameter in electronic form, said variable parameter being changed to continuously vary the contrast of the screen; and
   means for changing said parameter to selectively vary the contrast of the screen in response to said difference.

8. The apparatus as defined in claim 7 wherein said electronic signal providing means includes a scanner.

9. The apparatus as defined in claim 7 wherein said imaging member comprises a xerographic reproduction device.

* * * * *